United States Patent
Morgan et al.

(10) Patent No.: US 11,685,078 B2
(45) Date of Patent: Jun. 27, 2023

(54) APPLICATION OF WATER REQUIREMENT MEASUREMENTS TO APPROXIMATE SPECIFIC SURFACE AREA

(71) Applicant: Halliburton Energy Services, Inc., Houston, TX (US)

(72) Inventors: Ronnie Glen Morgan, Waurika, OK (US); Thomas Jason Pisklak, Cypress, TX (US); Sean William Riggio, Houston, TX (US); Samuel J. Lewis, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 849 days.

(21) Appl. No.: 16/479,056

(22) PCT Filed: Feb. 22, 2017

(86) PCT No.: PCT/US2017/018930
§ 371 (c)(1),
(2) Date: Jul. 18, 2019

(87) PCT Pub. No.: WO2018/156115
PCT Pub. Date: Aug. 30, 2018

(65) Prior Publication Data
US 2019/0358853 A1    Nov. 28, 2019

(51) Int. Cl.
*C04B 40/00* (2006.01)
*C09K 8/46* (2006.01)
(Continued)

(52) U.S. Cl.
CPC ............. *B28C 7/024* (2013.01); *B28C 9/004* (2013.01); *C04B 40/0032* (2013.01); *C09K 8/46* (2013.01); *E21B 33/13* (2013.01)

(58) Field of Classification Search
CPC ..... B28C 7/024; B28C 9/004; C04B 40/0032; C09K 8/46; E21B 33/13
See application file for complete search history.

(56) References Cited

U.S. PATENT DOCUMENTS

| | | | | |
|---|---|---|---|---|
| 4,370,166 A | * | 1/1983 | Powers | C09K 8/46 106/676 |
| 4,674,574 A | * | 6/1987 | Savoly | C04B 24/16 106/719 |

(Continued)

FOREIGN PATENT DOCUMENTS

| CN | 02286665 | 12/2003 |
|---|---|---|
| CN | 102516955 | 6/2012 |

(Continued)

OTHER PUBLICATIONS

ISRWO International Search Report and Written Opinion for PCT/US2017/018930 dated Nov. 9, 2017.

(Continued)

*Primary Examiner* — Crystal J. Lee
(74) *Attorney, Agent, or Firm* — Thomas Rooney; C. Tumey Law Group PLLC

(57) ABSTRACT

Methods of wellbore cementing are provided. A method of analyzing a solid particulate including: measuring a water requirement of the solid particulate; and determining an approximation of specific surface area of the solid particulate from the water requirement.

22 Claims, 4 Drawing Sheets

(51) Int. Cl.
*E21B 33/13* (2006.01)
*B28C 7/02* (2006.01)
*B28C 9/00* (2006.01)

(56) References Cited

U.S. PATENT DOCUMENTS

| | | | |
|---|---|---|---|
| 7,607,484 | B2 | 10/2009 | Roddy et al. |
| 7,631,692 | B2 | 12/2009 | Roddy et al. |
| 7,806,183 | B2 | 10/2010 | Roddy et al. |
| 7,892,352 | B2 | 2/2011 | Roddy et al. |
| 8,281,859 | B2 | 10/2012 | Roddy et al. |
| 8,333,240 | B2 | 12/2012 | Roddy et al. |
| 8,486,869 | B2 | 7/2013 | Brenneis et al. |
| 8,609,592 | B2 | 12/2013 | Guenthenspberger et al. |
| 8,609,595 | B2 | 12/2013 | Morgan et al. |
| 8,851,173 | B2 | 10/2014 | Brothers et al. |
| 8,997,578 | B2 | 4/2015 | Morgan et al. |
| 9,023,150 | B2 | 5/2015 | Brenneis et al. |
| 9,212,534 | B2 | 12/2015 | Ballew et al. |
| 9,505,972 | B2 | 11/2016 | Iverson et al. |
| 9,644,132 | B2 | 5/2017 | Morgan et al. |
| 10,370,579 | B2 | 8/2019 | Agapiou et al. |
| 11,174,198 | B2 | 11/2021 | Morgan et al. |
| 2004/0112255 | A1 | 6/2004 | Bruno et al. |
| 2010/0212892 | A1* | 8/2010 | Santra ............... C09K 8/467 166/250.14 |
| 2015/0184060 | A1* | 7/2015 | Morgan ............... C04B 18/162 106/692 |
| 2015/0260009 | A1 | 9/2015 | Rahman et al. |
| 2016/0264462 | A1 | 9/2016 | Soltanian et al. |
| 2017/0198547 | A1* | 7/2017 | Goel ............... E21B 33/16 |
| 2017/0364607 | A1* | 12/2017 | Kaushik ............... C09K 8/00 |

FOREIGN PATENT DOCUMENTS

| | | |
|---|---|---|
| CN | 103224772 | 9/2015 |
| CN | 105189402 | 12/2015 |
| EP | 1900703 | 3/2008 |
| RU | 2577340 C2 | 3/2016 |

OTHER PUBLICATIONS

Kashaev E.F. et al. About the Influence of the Specific Surface of Cement of Low Water on its Properties. International Scientific Journal. "Innovative Science". No. 11-2/2016. p. 44-46.

Russian Search Report with Official Action and Translations for Application No. 2019121896 dated Mar. 3, 2020.

Chinese Office Action with English Translation for Application No. 201780083251.2 dated Nov. 27, 2020.

Chinese Office Action for Application No. 201780083251.2, with partial translation, dated Jun. 29, 2021.

Research on Influence of the Performance of the Road Cement Concrete in Cement Technology Character, Z. Hui, with partial English translation, accessed Aug. 3, 2021.

* cited by examiner

APPLICATION OF WATER REQUIREMENT MEASUREMENTS TO APPROXIMATE SPECIFIC SURFACE AREA

BACKGROUND

In well cementing, such as well construction and remedial cementing, cement compositions are commonly utilized. Cement compositions may be used in a variety of subterranean applications. For example, in subterranean well construction, a pipe string (e.g., casing, liners, expandable tubulars, etc.) may be run into a well bore and cemented in place. The process of cementing the pipe string in place is commonly referred to as "primary cementing." In a typical primary cementing method, a cement composition may be pumped into an annulus between the walls of the well bore and the exterior surface of the pipe string disposed therein. The cement composition may set in the annular space, thereby forming an annular sheath of hardened, substantially impermeable cement (i.e., a cement sheath) that may support and position the pipe string in the well bore and may bond the exterior surface of the pipe string to the subterranean formation. Among other things, the cement sheath surrounding the pipe string functions to prevent the migration of fluids in the annulus, as well as protecting the pipe string from corrosion. Cement compositions also may be used in remedial cementing methods, for example, to seal cracks or holes in pipe strings or cement sheaths, to seal highly permeable formation zones or fractures, to place a cement plug, and the like.

A particular challenge in well cementing is the development of satisfactory mechanical properties in a cement composition within a reasonable time period after placement in the subterranean formation. Oftentimes several cement compositions with varying additives are tested to see if they meet the material engineering requirements for a particular well. The process of selecting the components of the cement composition are usually done by a best guess approach by utilizing previous slurries and modifying them until a satisfactory solution is reached. The process may be time consuming and the resulting slurry may be expensive. Furthermore, the cement components available in any one particular region may vary in composition from those of another region thereby further complicating the process of selecting a correct slurry.

BRIEF DESCRIPTION OF THE DRAWINGS

These drawings illustrate certain aspects of some of the embodiments of the present invention, and should not be used to limit or define the invention.

DETAILED DESCRIPTION

Figure 1:
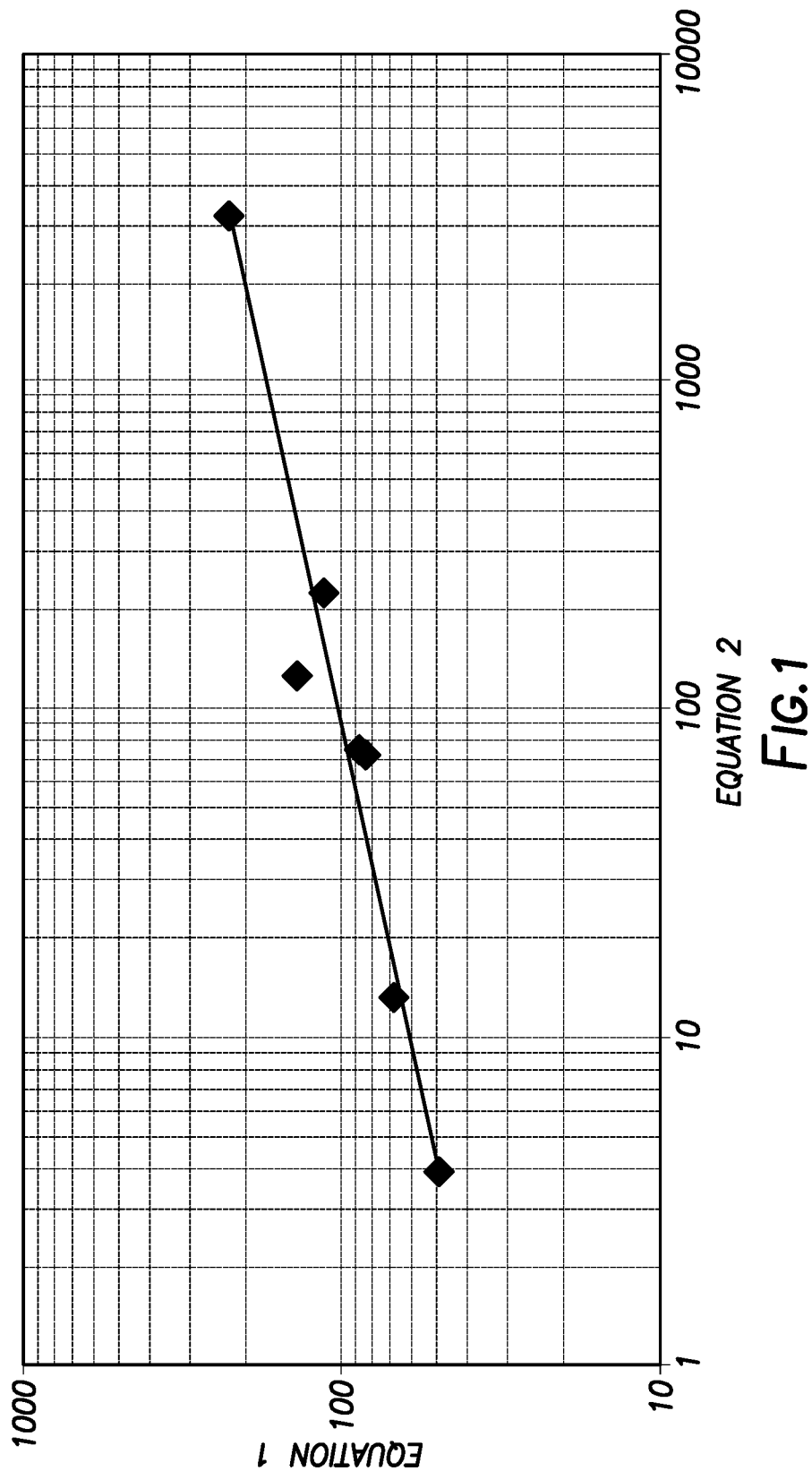
FIG. 1 is a chart showing simulated results for compressive strength index calculations.

The present disclosure may generally relate to cementing methods and systems. Provided herein are methods of identifying and categorizing silica sources, cements, and other materials based on physiochemical properties. In some examples, water requirement measurements may be correlated to specific surface area so that specific surface area of the cement component may be approximated. The physiochemical properties of each cement component of a cement composition may affect the final set mechanical properties of the slurry as well as the dynamic or time based properties such as mixability, rheology, viscosity, and others. Every cement component may affect one or more of the properties mentioned. For example, a locally sourced fly ash may be added to a cement composition. The added fly ash may increase the compressive strength of the cement composition and may have no effect on for example, the thickening time of the cement composition. In another region, a locally sourced fly ash may also increase the compressive strength of the cement composition but may also increase the thickening time. The unpredictable behavior of a cement composition may not be realized until multiple lab tests have been performed. As specific surface area measurements may require specialized equipment that may not always be available, water requirement measurement may be used to approximate the specific surface area. Once the specific surface area is available, the reactivity of the cement component may be determined and used in designing a cement composition.

The cement compositions generally may comprise water and a cement additive. The cement additive may comprise two or more cement components, which may be dry blended to form the cement additive prior to combination with the water. Alternatively, the cement components may not be combined until mixture with the water. The cement components may generally be described as alkali soluble. While a number of different embodiments are contemplated, a cement composition may comprise water and a cement additive, wherein the cement additive comprises hydraulic cement and two or more silica sources, such as cement kiln dust and a natural pozzolan. As described in more detail herein, the cement compositions may be foamed and/or extended as desired by those of ordinary skill in the art.

The cement compositions may have a density suitable for a particular application. The cement compositions may have a density in the range of about 8 pounds per gallon ("ppg") to about 16 ppg. In the foamed examples, the foamed cement compositions of the present invention may have a density in the range of about 8 ppg to about 13 ppg (or even lower).

The water used in the cement compositions may include, for example, freshwater, saltwater (e.g., water containing one or more salts dissolved therein), brine (e.g., saturated saltwater produced from subterranean formations), seawater, or combinations thereof. Generally, the water may be from any source, provided that it does not contain an excess of compounds that may undesirably affect other components in the cement composition. The water may be included in an amount sufficient to form a pumpable slurry. The water may be included in the cement compositions in the range of about 40% to about 200% by weight of the cement additive ("bwoc"). In some examples, the water may be included in an amount in the range of about 40% to about 150% bwoc.

The cement additive may comprise two or more cement components. A variety of hydraulic cements may be utilized in accordance with the present disclosure, including, but not limited to, those comprising calcium, aluminum, silicon, oxygen, iron, and/or sulfur, which set and harden by reaction with water. Suitable hydraulic cements may include Portland cements, gypsum, and high alumina content cements, among others. Portland cements that are suited for use in the present disclosure may be classified as Classes A, C, G, and H cements according to American Petroleum Institute, API Specification for Materials and Testing for Well Cements, API Specification 10, Fifth Ed., Jul. 1, 1990. In addition, in some examples, cements suitable for use in the present invention may be classified as ASTM Type I, II, III, or V. Cement compositions that may be considered "low Portland" may be designed by use of the techniques disclosed herein.

Where present, the hydraulic cement generally may be included in the cement compositions in an amount sufficient to provide the desired compressive strength, density, and/or cost. The hydraulic cement may be present in the cement compositions in any suitable concentration, including in an amount in the range of about 0% to about 99% bwoc. The hydraulic cement may be present in an amount ranging between any of and/or including any of about 1%, about 5%, about 10%, about 20%, about 40%, about 60%, about 80%, or about 90% bwoc. The cement component may be considered "low Portland" in that the Portland cement (where used) may be present in the cement composition in an amount of about 40% or less bwoc and, alternatively, about 10% or less. Cement compositions may also be designed that are free (or essentially free) of Portland cement. Those of ordinary skill in the art, with the benefit of this disclosure, should be able to select an appropriate amount of hydraulic cement for a particular application.

In addition to Portland cement, additional cement components may be used that can be considered alkali soluble. A cement component is considered alkali soluble where it is at least partially soluble in an aqueous solution of pH 7.0 or greater. Certain of the alkali soluble cement components may comprise a geopolymer cement, which may comprise an aluminosilicate source, a metal silicate source, and an activator. The geopolymer cement may react to form a geopolymer. A geopolymer is an inorganic polymer that forms long-range, covalently bonded, non-crystalline networks. Geopolymers may be formed by chemical dissolution and subsequent re-condensation of various aluminosilicates and silicates to form a 3D-network or three-dimensional mineral polymer. The activator may include, but is not limited to, metal hydroxides chloride salts such as KCl, $CaCl_2$, NaCl, carbonates such as $Na_2CO_3$, silicates such as sodium silicate, aluminates such as sodium aluminate, and ammonium hydroxide. The aluminosilicate source may comprise any suitable aluminosilicate. Aluminosilicate is a mineral comprising aluminum, silicon, and oxygen, plus counter-cations. There are potentially hundreds of suitable minerals that may be an aluminosilicate source in that they may comprise aluminosilicate minerals. Each aluminosilicate source may potentially be used in a particular case if the specific properties, such as composition, may be known. Some minerals such as andalusite, kyanite, and sillimanite are naturally occurring aluminosilicate sources that have the same composition, $Al_2SiO_5$, but differ in crystal structure. Each mineral andalusite, kyanite, or sillimanite may react more or less quickly and to different extents at the same temperature and pressure due to the differing crystal structures. Other suitable aluminosilicate sources may include, but are not limited to, calcined clays, partially calcined clays, kaolinite clays, lateritic clays, illite clays, volcanic rocks, mine tailings, blast furnace slag, and coal fly ash. The metal silicate source may comprise any suitable metal silicate. A silicate is a compound containing an anionic silicon compound. Some examples of a silicate include the orthosilicate anion also known as silicon tetroxide anion, $SiO_4^{4-}$ as well as hexafluorosilicate $[SiF_6]^{2-}$. Other common silicates include cyclic and single chain silicates which may have the general formula $[SiO_{2+n}]^{2n-}$ and sheet-forming silicates $([SiO_{2.5}]^-)_n$. Each silicate example may have one or more metal cations associated with each silicate molecule. Some suitable metal silicate sources and may include, without limitation, sodium silicate, magnesium silicate, and potassium silicate.

Where present, the geopolymer cement generally may be included in the cement compositions in an amount sufficient to provide the desired compressive strength, density, and/or cost. The geopolymer cement may be present in the cement compositions in any suitable concentration, including an amount in the range of about 0% to about 99% bwoc. The geopolymer cement may be present in an amount ranging between any of and/or including any of about 1%, about 5%, about 10%, about 20%, about 40%, about 60%, about 80%, or about 90% bwoc. Those of ordinary skill in the art, with the benefit of this disclosure, should be able to select an appropriate amount of geopolymer cement for a particular application.

Additional cement components that are alkali soluble may include a silica source. The silica source may be any suitable material that provides silica to the cement composition. By inclusion of the silica source, a different path may be used to arrive at a similar product as from Portland cement. A pozzolanic reaction may be induced wherein silicic acid ($H_4SiO_4$) and portlandite ($Ca(OH)_2$ react to form a cement product (calcium silicate hydrate). If other compounds, such as, aluminate, are present in the silica source, additional reactions may occur to form additional cement products, such as calcium aluminate hydrates. Calcium hydroxide necessary for the reaction may be provide from other cement components, such as Portland cement, or may be separately added to the cement composition. Examples of suitable silica sources may include fly ash, slag, silica fume, crystalline silica, silica flour, cement kiln dust ("CKD"), volcanic rock, perlite, metakaolin, diatomaceous earth, zeolite, shale, and agricultural waste ash (e.g., rice husk ash, sugar cane ash, and bagasse ash), among other. Some specific examples of the silica source will be discussed in more detail below. Where present, the silica source generally may be included in the cement compositions in an amount sufficient to provide the desired compressive strength, density, and/or cost. The silica source may be present in the cement compositions in any suitable concentration, including in an amount in the range of about 0% to about 99% bwoc. The silica source may be present in an amount ranging between any of and/or including any of about 1%, about 5%, about 10%, about 20%, about 40%, about 60%, about 80%, or about 90% bwoc. Those of ordinary skill in the art, with the benefit of this disclosure, should be able to select an appropriate amount of silica source for a particular application.

An example of a suitable silica source may comprise fly ash. A variety of fly ash may be suitable, including fly ash classified as Class C and Class F fly ash according to American Petroleum Institute, API Specification for Materials and Testing for Well Cements, API Specification 10, Fifth Ed., Jul. 1, 1990. Class C fly ash comprises both silica and lime, so it may set to form a hardened mass upon mixing with water. Class F fly ash generally does not contain a sufficient amount of lime to induce a cementitious reaction, therefore, an additional source of calcium ions is necessary for a set-delayed cement composition comprising Class F fly ash. Where used, lime may be mixed with Class F fly ash in any suitable amount, including in an amount in the range of about 0.1% to about 100% by weight of the fly ash. In some instances, the lime may be hydrated lime. Suitable examples of fly ash include, but are not limited to, POZMIX® A cement additive, commercially available from Halliburton Energy Services, Inc., Houston, Tex.

Another example of a suitable silica source may comprise slag. Slag is generally a by-product in the production of various metals from their corresponding ores. By way of example, the production of cast iron can produce slag as a granulated, blast furnace by-product with the slag generally comprising the oxidized impurities found in iron ore. Slag generally does not contain sufficient basic material, so slag cement may be used that further may comprise a base to produce a settable composition that may react with water to set to form a hardened mass. Examples of suitable sources of bases include, but are not limited to, sodium hydroxide, sodium bicarbonate, sodium carbonate, lime, and combinations thereof.

Another example of a suitable silica source may comprise CKD. Cement kin dust or "CKD", as that term is used herein, refers to a partially calcined kiln feed which is removed from the gas stream and collected, for example, in a dust collector during the manufacture of cement. Usually, large quantities of CKD are collected in the production of cement that are commonly disposed of as waste. Disposal of the CKD as waste can add undesirable costs to the manufacture of the cement, as well as the environmental concerns associated with its disposal. CKD is another component that may be included in examples of the cement compositions.

Another example of a suitable silica source may comprise volcanic rock. Certain volcanic rocks can exhibit cementitious properties, in that they may set and harden in the presence of hydrated lime and water. The volcanic rock may also be ground, for example. Generally, the volcanic rock may have any particle size distribution as desired for a particular application. In certain embodiments, the volcanic rock may have a mean particle size in a range of from about 1 micron to about 200 microns. The mean particle size corresponds to d50 values as measured by particle size analyzers such as those manufactured by Malvern Instruments, Worcestershire, United Kingdom. One of ordinary skill in the art, with the benefit of this disclosure, should be able to select a particle size for the volcanic rock suitable for use for a chosen application.

Another example of a suitable silica source may comprise metakaolin. Generally, metakaolin is a white pozzolan that may be prepared by heating kaolin clay, for example, to temperatures in the range of about 600° to about 800° C.

Another example of a suitable silica source may comprise shale. Among other things, shale included in the cement compositions may react with excess lime to form a suitable cementing material, for example, calcium silicate hydrate. A variety of shales are suitable, including those comprising silicon, aluminum, calcium, and/or magnesium. An example of a suitable shale comprises vitrified shale. Generally, the shale may have any particle size distribution as desired for a particular application. In certain embodiments, the shale may have a particle size distribution in the range of about 37 micrometers to about 4,750 micrometers.

Another example of a suitable silica source may comprise zeolite. Zeolites generally are porous alumino-silicate minerals that may be either a natural or synthetic material. Synthetic zeolites are based on the same type of structural cell as natural zeolites, and may comprise aluminosilicate hydrates. As used herein, the term "zeolite" refers to all natural and synthetic forms of zeolite. Examples of zeolites may include, without limitation, mordenite, zsm-5, zeolite x, zeolite y, zeolite a, etc. Furthermore, examples comprising zeolite may comprise zeolite in combination with a cation such as $Na^+$, $K^+$, $Ca^{2+}$, $Mg^{2+}$, etc. Zeolites comprising cations such as sodium may also provide additional cation sources to the cement composition as the zeolites dissolve.

The cement compositions may further comprise hydrated lime. As used herein, the term "hydrated lime" will be understood to mean calcium hydroxide. In some examples, the hydrated lime may be provided as quicklime (calcium oxide) which hydrates when mixed with water to form the hydrated lime. The hydrated lime may be included in examples of the cement compositions, for example, to form a hydraulic composition with the silica source. The hydrated lime may be included in any suitable concentration, including, but not limited to, in a silica source-to-hydrated-lime weight ratio of about 10:1 to about 1:1 or a ratio of about 3:1 to about 5:1. Where present, the hydrated lime may be included in the cement compositions in an amount in the range of from about 10% to about 100% by weight of the silica source, for example. The hydrated lime may be present in an amount ranging between any of and/or including any of about 10%, about 20%, about 40%, about 60%, about 80%, or about 100% by weight of the silica source. One of ordinary skill in the art, with the benefit of this disclosure, should recognize the appropriate amount of hydrated lime to include for a chosen application.

The cement compositions may also comprise a calcium source other than hydrated lime, which may be used in addition, or in place of the hydrated lime. In general, calcium and a high pH, for example a pH of 7.0 or greater, may be needed for certain cementitious reactions to occur. A potential advantage of hydrated lime may be that calcium ions and hydroxide ions are supplied in the same molecule. In another example, the calcium source may be $Ca(NO_3)_2$ or $CaCl_2$ with the hydroxide being supplied form NaOH or KOH, for example. One of ordinary skill would understand the alternate calcium source and hydroxide source may be included in a cement composition in the same way as hydrated lime. For example, the calcium source and hydroxide source may be included in any suitable amount, including, but not limited to, a silica source-to-hydrated-lime weight ratio of about 10:1 to about 1:1 or a ratio of about 3:1 to about 5:1. Where present, the alternate calcium source and hydroxide source may be included in the cement compositions in an amount in the range of from about 10% to about 100% by weight of the silica source, for example. The alternate calcium source and hydroxide source may be present in an amount ranging between any of and/or including any of about 10%, about 20%, about 40%, about 60%, about 80%, or about 100% by weight of the silica source. One of ordinary skill in the art, with the benefit of this disclosure, should recognize the appropriate amount of alternate calcium source and hydroxide source to include for a chosen application.

A target silica lime ratio may be defined and a cement additive comprising two or more cement components may be identified that meets the silica lime ratio. In some examples, the target silica lime ratio may range from about 80/20 silica to free lime by weight to about 60/40 silica to free lime by weight, for example, be about 80/20 silica to free lime by weight, about 70/30 silica to free lime by weight, or about 60/40 silica to free lime by weight. The silica lime ratio may be determined by measuring the available silica and lime for a given cement component.

Other additives suitable for use in cementing operations also may be included in the cement compositions as needed for a particular application. Examples of such additives include, but are not limited to: weighting agents, activators, lightweight additives, gas-generating additives, mechanical-property-enhancing additives, lost-circulation materials, filtration-control additives, fluid-loss-control additives, defoaming agents, foaming agents, dispersants, thixotropic additives, and combinations thereof. One of ordinary skill in the art, with the benefit of this disclosure, should be able to select an appropriate additive for a particular application.

As mentioned previously, in order to determine if two or more of the aforementioned cement components are compatible, several lab tests may be run. Additionally, any potential synergistic effects of the cement component may not be known unless several laboratory tests are performed. Typically, a known cement composition may be first formulated and tested for properties such as, for example, the 24 hour compressive strength, fluid loss, and thickening time. Then, varying amounts of additives may be added to a fresh batch of cement compositions and the tests are re-run. The results are gathered form each test and compared. A new set of tests may then run with new concentrations of additives, for example, to adjust properties of the cement composition. The process of testing various additives in varying concentrations may go on for several trials until an acceptable cement composition or compositions is formulated. An acceptable cement composition may be one that meets certain design requirements, such as compressive strength, fluid loss, and thickening time. The cement composition design process may be done in a heuristic manner leading to a cement composition that may have the required engineering properties but may not be optimized for cost. Additionally, silica sources such as, for example, CKD, have been previously used as either pure fillers or in some examples, reactive components, in Portland based cement compositions. CKD will contribute a portion of silica which requires a portion of lime to react. In methods of cement composition formulation described above, the heuristic process does not take into account the silica to lime ratio of a composition.

The method described herein may reduce or eliminate the heuristic search for by a process that identifies cement components for use in a cement composition through a process of measuring and categorizing a variety of cement components referred to as reactivity mapping. Reactivity mapping may comprise several steps. One step may comprise measuring the physical and chemical properties of different materials through standardized tests. Another step may comprise categorizing the materials through analysis of data collected and the predicted effect on cement slurry properties. Yet another step may comprise utilizing the data to estimate material reactivity, optimizing cement performance, predicting blend mechanical properties mathematically based on analytical results, and/or predict slurry density dependence of compressive strength.

Measuring physical and chemical properties of each selected cement component may comprise many laboratory techniques and procedures including, but not limited to, microscopy, spectroscopy, x-ray diffraction, x-ray fluorescence, particle size analysis, water requirement analysis, scanning electron microscopy, energy-dispersive X-ray spectroscopy, surface area, specific gravity analysis, thermogravimetric analysis, morphology analysis, infrared spectroscopy, ultraviolet-visible spectroscopy, mass spectroscopy, secondary ion mass spectrometry, electron energy mass spectrometry, dispersive x-ray spectroscopy, auger electron spectroscopy, inductively coupled plasma analysis, thermal ionization mass spectroscopy, glow discharge mass spectroscopy x-ray photoelectron spectroscopy, mechanical property testing, Young's Modulus testing, rheological properties, Poisson's Ratio. One or more of the preceding tests may be consider API tests, as set forth in the API recommended practice for testing well cements (published as ANSI/API recommended practice 10B-2). Additional API tests not specifically listed above may also be used for the measurements. The physical and chemical properties may be measured for a group of cement components. Two or more of the cement components measured may be different types of cement components (e.g., volcanic rock, CKD, fly ash, etc.). Two or more of the cement components may be the same type but from different sources (e.g., volcanic rock from source 1, volcanic rock from source 2, etc.).

X-ray powder diffraction is one analysis technique that may be used for measuring the physical and chemical properties of the cement components. X-ray powder diffraction is a technique of exposing a sample to x-rays, neutrons, or electrons and measuring the amount of inter-atomic-diffraction. The sample acts a diffraction grating thereby producing a differing signal at different angles. The typical properties that may be measured are the phase identification for the identification and characterization of a crystalline solid. Other properties may be crystallinity, lattice parameters, expansion tensors, bulk modulus, and phase transitions.

X-ray fluorescence is another analysis technique that may be used for measuring the physical and chemical properties of the cement components. X-ray fluorescence may use short wave x-rays to ionize atoms in a sample thereby causing them to fluoresce at certain characteristic wavelengths. The characteristic radiation released by a sample may allow accurate identification of the component atoms in the sample as well as their relative amounts.

Particle size analysis is another analysis technique that may be used for measuring the physical and chemical properties of the cement components. Particle size analysis may be accomplished through analysis by various laboratory techniques including but not limited to laser diffraction, dynamic light scattering, static image analysis, and dynamic image analysis. Particle size analysis may also provide information about the morphology of a particular sample. Morphology may include parameters such as sphericity and roundness as well as the general shape of a particle such as disk, spheroid, blade, or roller. With a knowledge of the morphology and particle size, the average surface area and volume may be estimated. Surface area and volume may be important in determining the water requirement as well as reactivity. In general, a relatively smaller particle size may react more quickly than a relatively larger particle size. Also the relatively smaller particle size may have a greater water requirement to completely hydrate than a relatively larger particle size.

Energy dispersive x-ray spectroscopy is another analysis technique that may be used for measuring the physical and chemical properties of the cement components. Energy dispersive x-ray spectroscopy is an analytical technique used to analyze the elements present in a sample and determine the chemical characterization of a sample. Other techniques may include fourier transform infrared spectroscopy, ultraviolet-visible spectroscopy, mass spectroscopy, secondary ion mass spectrometry, electron energy mass spectrometry, dispersive x-ray spectroscopy, auger electron spectroscopy, and x-ray photoelectron spectroscopy.

The cement components may be analyzed to determine their water requirement. Water requirement is typically defined as the amount of mixing water that is required to be added to a powdered, solid material to form a slurry of a specified consistency. The consistency may vary for a particular application. The following example technique for determining water requirement holds the consistency and amount of water constant while varying the amount of the solid material. However, techniques may also be applied that vary the amount of the water, the consistency, and/or the amount of solid material in any combination. The following technique also estimates the specified consistency based on the size of the vortex at the surface of the mixture in the blender. Water requirement for a particular cement component may be determined by a process that includes a) preparing a blender (e.g., Waring® blender) with a specified amount of water (e.g., about 100 grams to about 500 grams), b) agitating the water at a specified blender rpm (e.g., 4,000 to 15,000 rpm), c) adding the powdered solid that is being investigated to the water until a specified consistency is obtained, and d) calculating the water requirement based on the ratio of water to solids required to obtain the desired consistency. A specific example for determining water requirement may include, but is not limited to: 1) preparing a blender (e.g., Waring® blender) with a specified amount of water (e.g., about 100 grams to about 500 grams or about 200 grams in one example); 2) agitating the water at a specified blender rpm (e.g., about 4,000 to about 15,000 rpm or about 12,000 rpm in one example); 3) adding a specified amount (e.g., about 1 gram to about 1,000 grams or about 400 grams in one example) of the cement component to the water; 4) observing mixture to determine if a specified consistency is obtained, for example, the cement component can be considered thoroughly wet and mixed if the vortex formed at the surface of the mixture in the blender is about 0 inches (0 mm) to about 2 inch (50 mm) or about 0.004 inches (0.1 mm) to about 1 inch (25 mm); 5) if the desired consistency is not obtained, add more cement component until desired consistency is obtained, for example, the vortex formed in the blender is about the size of a dime; and 6) calculate the water requirement based on the ratio of water to cement component to obtain the desired consistency. In some examples, the specific consistency may be where a vortex at the surface of the mixture in the blender is the size of a dime or about 0.7 in (17.9 mm). Other suitable techniques for determining the water requirement may also be used as will be appreciated by those of ordinary skill in the art.

The cement components may be analyzed to determine their specific surface area. Specific surface area generally refers to the total surface area and may be reported as the total surface area per unit mass. Values obtained for specific area are dependent on the analysis technique. Any suitable analysis technique may be used, including, without limitation, adsorption based methods such as Brunauer-Emmett-Teller (BET) analysis, methylene blue staining, ethylene glycol monoethyl ether adsorption, and a protein-retention method, among other.

Thermogravimetric analysis is another analysis technique that may be used for measuring the physical and chemical properties of the cement components. Thermogravimetric analysis is a method of thermal analysis wherein changes in physical and chemical properties of a sample may be measured. In general the properties may be measured as a function of increasing temperature, such as with a constant heating rate, or as a function of time with a constant temperature or a constant mass change. Properties determined by thermogravimetric analysis may include first-order phase transitions and second-order phase transitions such as vaporization, sublimation, adsorption, desorption, absorption, chemisorption, desolvation, dehydration, decomposition, oxidation and reduction reactions, ferromagnetic transition, superconducting transition, and others.

In addition to determining physical and chemical properties of the cement components themselves, laboratory tests may also be run to determine behavior of the cement components in a cement composition. For example, the cement components may be analyzed in a cement composition to determine their compressive strength development and mechanical properties. For example, a preselected amount of the cement component may be combined with water and lime (if needed for setting). The mechanical properties of the cement composition may then be determined including, compressive strength, tensile strength, and Young's modulus. Any of a variety of different conditions may be used for the testing so long as the conditions are consistent for the different cement components.

Compressive strength is generally the capacity of a material or structure to withstand axially directed pushing forces. The compressive strength of the cement component may be measured at a specified time after the cement component has been mixed with water and the resultant cement composition is maintained under specified temperature and pressure conditions. For example, compressive strength can be measured at a time in the range of about 24 to about 48 hours (or longer) after the fluid is mixed and the fluid is maintained at a temperature of from 100° F. to about 200° F. and atmospheric pressure. Compressive strength can be measured by either a destructive method or non-destructive method. The destructive method physically tests the strength of treatment fluid samples at various points in time by crushing the samples in a compression-testing machine. The compressive strength is calculated from the failure load divided by the cross-sectional area resisting the load and is reported in units of pound-force per square inch (psi). Non-destructive methods typically may employ an Ultrasonic Cement Analyzer ("UCA"), available from Fann® Instrument Company, Houston, Tex. Compressive strengths may be determined in accordance with API RP 10B-2, *Recommended Practice for Testing Well Cements*, First Edition, July 2005.

Tensile strength is generally the capacity of a material to withstand loads tending to elongate, as opposed to compressive strength. The tensile strength of the cement component may be measured at a specified time after the cement component has been mixed with water and the resultant cement composition is maintained under specified temperature and pressure conditions. For example, tensile strength can be measured at a time in the range of about 24 to about 48 hours (or longer) after the fluid is mixed and the fluid is maintained at a temperature of from 100° F. to about 200° F. and atmospheric pressure. Tensile strength may be measured using any suitable method, including, without limitation, in accordance with the procedure described in ASTM C307. That is, specimens may be prepared in briquette molds having the appearance of dog biscuits with a one square inch cross-sectional area at the middle. Tension may then be applied at the enlarged ends of the specimens until the specimens break at the center area. The tension in pounds per square inch at which the specimen breaks is the tensile strength of the material tested.

Young's modulus also referred to as the modulus of elasticity is a measure of the relationship of an applied stress to the resultant strain. In general, a highly deformable (plastic) material will exhibit a lower modulus when the confined stress is increased. Thus, the Young's modulus is an elastic constant that demonstrates the ability of the tested material to withstand applied loads. A number of different laboratory techniques may be used to measure the Young's modulus of a treatment fluid comprising a cementitious component after the treatment fluid has been allowed to set for a period of time at specified temperature and pressure conditions.

Although only some select laboratory techniques may have been mentioned, it should be understood that there may many analytical techniques that may be appropriate or not appropriate for a certain sample. One of ordinary skill in the art with the benefit of this disclosure should be able to select an appropriate analytical technique to determine a certain property of interest.

Once the analytical techniques have been performed on the cement components, the data may be categorized and correlated. Some categories may include, but are not limited to, specific surface area, morphology, specific gravity, water requirement, etc. In some examples, the components may be categorized by relative amounts, including amount of at least one following: silica, alumina, iron, iron, calcium, calcium, sodium, potassium, magnesium, sulfur, oxides thereof, and combinations thereof. For example, the components may be categorized based on an oxide analysis that includes without limitation, silica content, calcium oxide content, and alumina content among other oxides that may be present in the cement component. In addition, correlations between the cement components may be generated based on the categorization of the data. For example, the various categories of properties may be plotted against one another. In some examples, water requirement versus specific surface area may be plotted. Accordingly, the water requirement of the cement component may be correlated to the specific surface area so that the specific surface area is a function of water requirement. Specific surface area may be used to predict reactivity of a cement component (or components). However, specific surface area may not always be available for each material as specific surface area analysis typically requires a specialized instrument. Accordingly, if the water requirement may be obtained for the cement component, the correlation between water requirement and specific surface area may be used to obtain an approximation for specific surface area, which may then be used to predict reactivity. The correlation between water requirement and specific surface may include, but not be limited to, a graph of water requirement versus specific surface or an equation that assigns an output of specific surface area based on an input of water requirement. In addition to correlations between specific surface area and reactivity, correlations may also be made between specific surface area and other mechanical properties such as tensile strength and Young's modulus.

Some cement components that are alkali soluble may comprise reclaimed or natural materials. Specifically silica containing cement components may comprise materials such as mined materials, for example volcanic rock, perlite, waste materials, such as fly ash and CKD, and agricultural ashes as previously described. In some examples the cement component that is alkali soluble may have synergistic effects with a Portland cement while others may be incompatible. In some examples a cement component that is alkali soluble may cause gelation, high heat generation, water retention, among other effects. These and other effects may be realized during laboratory testing of the cement component in a cement composition comprising Portland cement. Laboratory equipment may be configured to detect the effects of the cement component on the composition. In some examples, equipment such a calorimeter may measure and quantify the amount of heat generation per unit mass of the cement component. Viscometers may measure the increase in gelation caused by the cement component. Each of the physical effects caused by the addition of the cement component may be measured at several concentrations and then categorized, e.g., plotted or mapped. Once a component is mapped, the effect of adding the component to a cement composition may be predicted by referencing the categorization.

As mentioned previously, some cement components that are alkali soluble may induce gelling when included in a cement composition. Although a higher gelling rate may be undesirable in some examples, in other examples, a higher gelling rate may be advantageous or necessary to meet the engineering design criteria. Usually one of ordinary skill in the art would select a suitable gelling agent or viscosifier for use in the cement composition. With the benefit of mapping, one of ordinary skill should be able to select a cement component that is alkali soluble that may serve a dual purpose. For example, a cement component may increase the compressive strength of a cement composition but also increase the gelling during mixing. If the engineering design criteria require a higher gelling during mixing, it may be advantageous to include the cement component that increases the compressive strength while also increasing gelling. The inclusion of a cement component that exhibits multiple effects may reduce the amount of additional additives, such as gelling agents or viscosifiers, needed, which may be high cost. Since the component's gelling effect may have been documented in a map, the amount of component to include in a cement composition may be readily determined.

Another potentially advantageous physical effect that may be mapped is dispersing ability. Some cement components may comprise relatively spherical particles. The relatively spherical particles may exert a "roller bearing" effect in a cement composition with water. The effect may cause the other components in the cement composition to become more mobile thereby dispersing the components in the cement composition. Another potentially advantageous physical property that may be mapped is surface area. Surface area may relate to density wherein a relatively higher surface area particle may lower the density of a cement composition. Particles which lower the density may be used as a low density additive. Another potentially advantageous effect that may be mapped is particle size. Components with relatively smaller particle sizes may have the ability to form a filter cake against a formation thereby blocking cement from escaping into a formation. Cement components with a small particle size may be used as a fluid loss control agent. With the benefit of the present disclosure, one of ordinary skill should be able to select a cement component and map its properties. One of ordinary skill should also be able to select a secondary property of interest of the cement component and with the benefit of the map, create a slurry with the desired properties.

Another potential benefit of replacing traditional cement additives with silica based cement components is a reduction in cost. A silica based cement component may partially or fully replace a relatively more expensive cement additive as discussed above. The cost of the cement composition may be optimized by balancing the required engineering parameters such as compressive strength, mix ability, free water content, and others in order to maximize the amount of relatively lower cost silica based cement components. Any remaining deviation from the engineering requirement may be "made up" with the relatively more expensive cement additive. In this way, the cement composition may be reduced to a minimum cost per pound since the engineering requirements are met with a blend of primarily lower cost components.

Once the data is collected by the chosen laboratory techniques, categorized, and mapped, several operations may be performed on the data in order to yield predictions about a cement composition that comprises mapped cement components. Set properties, for example, may be estimated. A method of estimating the material reactivity based on the reactive index will be described below. Material reactivity may be based on many parameters such as specific surface area and specific gravity, among others. Another use for the mapped data may be to optimize cement slurry performance based on parameters such as particle shape, particle size, and particle reactivity. The data may also be used to predict and capture slurry density dependence of compressive strength and use the insight gathered to design optimized cement formulations. The data may also be used to predict a slurry composition to achieve an optimal cement formulation. The criteria for just right may be compressive strength, cost, rheology, mechanical properties, fluid loss control properties, thickening times, and others.

Reactivity mapping may be used to estimate various mechanical properties of a cement component, including compressive strength, tensile strength, and Young's modulus. As previously described, correlations may be made between specific surface area and certain mechanical properties, such as reactivity, tensile strength, and Young's modulus. Using these correlations the mechanical properties for a cement component or combination of cement components may be predicted.

One technique that may be used to correlate reactivity and specific surface area is the reactive index. Without being limited by theory, the reactive index of a cement component may be referred to as a measure of the cement component's reactivity as adjusted for differences in surface area. It is important to note that the term "cement component" refers to any material that is cementitious when mixed with water and/or lime and a suspending agent, when necessary, such that the slurry is stable. A "cementitious reactive index" $CRI_i$ can be defined as, but not limited to, Equation [1] as follows:

$$CRI_i = f_{CRI}(CS_i, \rho_i, SSA_{PSDi}) \quad [1]$$

Where:
$CS_i$=Unconfined UCS (ultimate compressive strength) obtained from samples cured at specific reference temperature, pressure and age.
$\rho_i$=Density of slurry that was prepared and cured for measuring UCS
$SSA_{PSDi}$=Specific surface area obtained by typical particle size analysis methods.

A "physicochemical index" (PCI) of the cementitious component may be defined as, but not limited to Equation [2]:

$$PCI_i = f_{PCI}(BETSA_i, SG_i, D_{50}, C_{Si}, C_{Ca}, C_{Al}, C_{Na}, C_{Fe}, C_{other\ species}) \quad [2]$$

Where:
$BETSA_i$=Surface area obtained by a nitrogen adsorption method of cementitious component i,
$SG_i$=specific gravity of the cementitious component i,
$D_{50}$=mass average or volume average diameter of the particle size distribution of cementitious component i,
$C_{Si}$=Mass concentration of silica oxide of component i,
$C_{Ca}$=Mass concentration of calcium oxide of component i,
$C_{Al}$=Mass concentration of Aluminum oxide of component i,
$C_{Na}$=Mass concentration of sodium oxide of component i,
$C_{Fe}$=Mass concentration of iron oxide of component i, It should be noted that the mass concentrations referenced above and here to for, may be measured, but is not limited to X-ray fluorescence spectroscopy measuring technique and a reference to "component i" is equivalent to "cementitious component i". The functions in Equations [1] and [2] that define $CRI_i$ and $PCI_i$, when properly defined, the following universal relationship may hold for a wide range of cementitious materials such as, but not limited to, Portland cements; fly ash; other pozzolanic materials; other ashes; etc.

$$CRI_i = f_{CRI-PCI}(PCI_i) \quad [3]$$

FIG. 1 is a graph of Equation [1] versus Equation [2], illustrating the accuracy of Equations [1], [2] and [3] when applied to five different types of cementitious material sources and three samples of similar materials but from different sources. The simulated data was found to have a relationship of $y=36.252x^{0.2256}$, wherein $R^2=0.9406$.

In some examples, the form of Equation [3] may be a power law, such as in Equation 4.

$$CRI_i = A\{PCI_i\}^B \quad [4]$$

A and B are coefficients that may be unique the various species and sources of cementitious materials selected. Once the generalized function defined in Equation [4] is defined for a given population or group of cementitious components, a linear or nonlinear summation relationship further defined below, may be used in conjunction with Equation [5] to predict the UCS of various combinations of cementitious materials for specified slurry densities, temperatures, pressures and curing age.

$$CRI_c = A\{PCI_c\}^B \quad [5]$$

Where,
$CRI_c$ is defined as the CRI for the unique combination of n cementitious components as the composite, and similarly
$PCI_c$ is defined as the Physicochemical Index for the composite.

A given composite with mass of $m_c$ is defined as:

$$m_c = f_i + f_{i+1} + f_{i+2} + f_n \quad [6]$$

Where: $f_i$ is defined as the mass fraction of the cementitious component i, and n is the total number of independent cementitious components. Once the function is defined in Equation [5], then the composite value of the physicochemical reactive index may be computed using Equation [7] as follows:

$$PCI_c = f_1 PCI_1 + f_2 PCI_2 + f_3 PCI_3 + \ldots + f_n PCI_n \quad [7]$$

Where: $PCI_c$ is defined as the overall reactive index for a blend of n number of uniquely independent cementitious components, $f_i$ is defined as the mass fraction of the cementitious component i, and n is the total number of independent cementitious components. Once $PCI_c$ has been determined for specific assumed blend of selected cementitious components, then the linear or non-linear summations (Equations [8] and [9]) are determined for the following terms:

$$\rho_c = f_1 \rho_1 + f_2 \rho_2 + f_3 \rho_3 + \ldots + f_n \rho_n \quad [8]$$

and, $$SSA_{PSDc} = f_1 SSA_{PSD1} + f_2 SSA_{PSD2} + f_3 SSA_{PSD3} + \ldots + f_n SSA_{PSDn} \quad [9]$$

$PCI_c$ is used to compute the value of $CRI_c$ using either Equation [5] or the more generalized form of Equation [3] for the composite terms. Once $CRI_c$ is determined for the given composite blend, then the composite values of $\rho_c$ and $SSA_{PSDc}$ may be used along with Equation [10] to predict the actual compressive strength of the composite blend, $CS_c$.

$$CRI_c = f_{CRI}(CS_c, \rho_c, SSA_{PSDc}) \quad [10]$$

Experimental data was collected for specific composite blends and is summarized in the table below:

TABLE 1

| Mass Fractions of Cementitious Components | | | |
| --- | --- | --- | --- |
| Cementitious Component | Composite Blend 1 | Composite Blend 2 | Composite Blend 3 |
| A | 0.36 | | 0.53 |
| B | | 0.32 | |
| C | 0.32 | | 0.31 |
| D | | 0.33 | |
| E | 0.32 | | |
| F | | 0.35 | |
| G | | | 0.16 |
| Totals | 1.00 | 1.00 | 1.00 |

It is important to note that each of the cementitious components above were either distinctly different species (type) of cementitious composition and/or from a different source.

Figure 2:
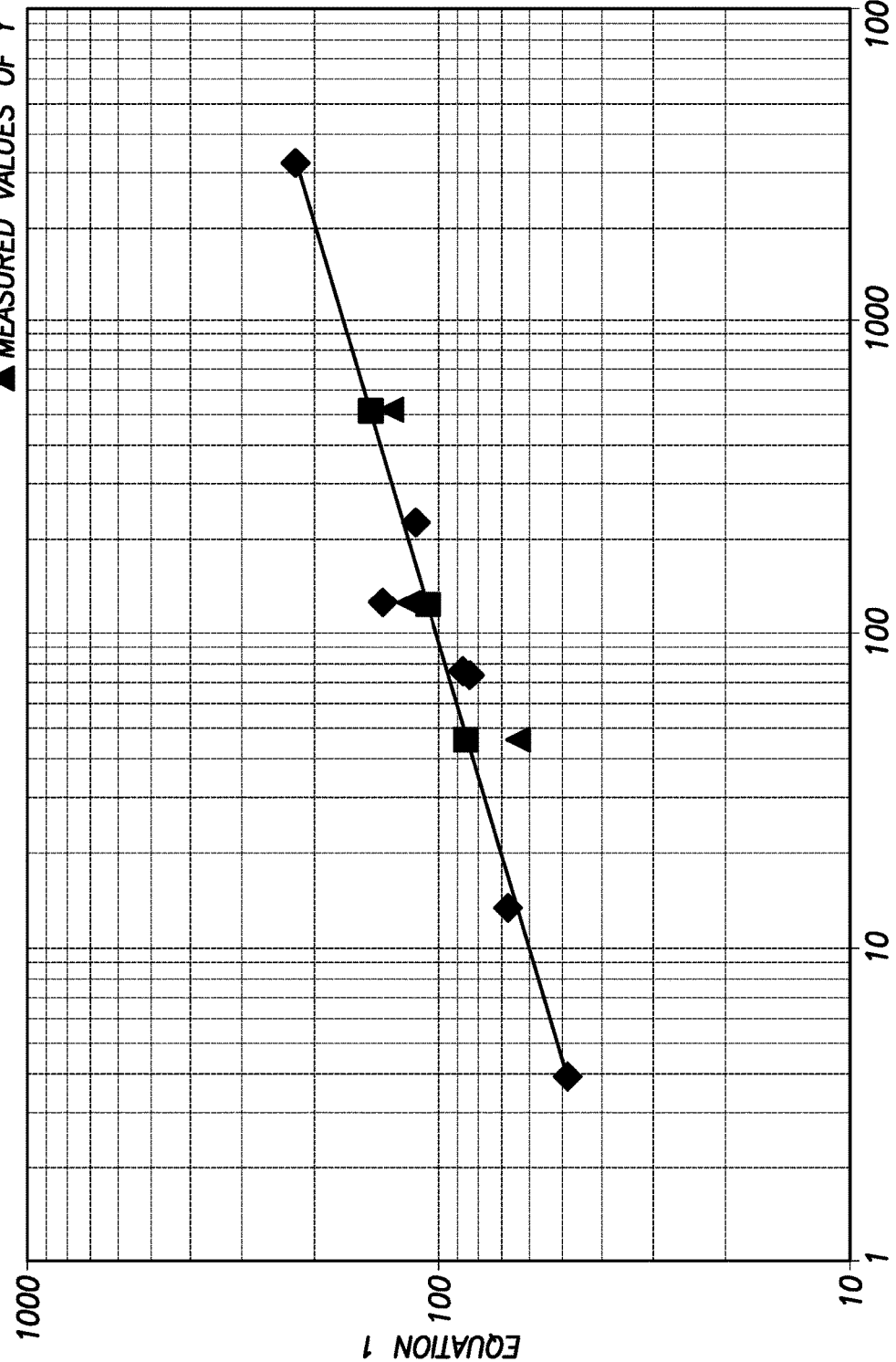
FIG. 2 is a chart showing simulated results for compressive strength index calculations.

FIG. 2 is another plot of Equation [1] versus Equation [2], showing the accuracy of Equations [1], [2], and [3]. Equations [1] through [10] may also be used for predicting other mechanical properties, including but not limited to, Young's Modulus of Elasticity and Tensile Strength. Additionally, it should be noted that even though a "linear summation" technique is presented in the previous development, that this invention also includes other methods such as the non-linear summation method presented in Equation [11].

$$PCI_c = (1+f_1)^{a_1} PCI_1 + (1+f_2)^{a_2} PCI_2 + (1+f_3)^{a_3} PCI_3 + \ldots + (1+f_n)^{a_n} PCI_n \quad [11]$$

Where: ai are exponents that are determined for a unique set of cementitious components.

Further examples using the reactive index, water requirement and other analytical parameters will now be discussed. A statistical table may be generated that plots reactive index against water requirement. An example is shown in Table 2.

TABLE 2

| Reactive Index Vs. Water Requirement | | | | |
| --- | --- | --- | --- | --- |
| Water Requirement | High | X1 | X4, X5 | X8 |
| | Medium | X2 | X6 | X9, X10 |
| | Low | X3 | X7 | X11 ... Xn |
| | | Low | Medium | High |
| | | | Reactive Index | |

Other analytical parameters such as particle size versus reactive index, heat generation versus reactive index, and others may also be used. By ranking the reactive index against an analytical parameter, a blend of components may be selected that has a minimized cost and an optimized reactive index while still having a mixable composition. In some examples, a selected cement composition may have too much free water to set properly. In such examples, a component having a high water requirement may be selected to replace a component in the cement composition or supplement the cement composition. The selected component having the high water requirement may be selected based on the reactive index to ensure that the overall blend has sufficient reactivity. A cement composition comprising the selected cement component may exhibit less free water due to the high water requirement of the component and may also exhibit the same reactivity from selecting the appropriate reactive index. The reactivity of a cement composition may be tuned based on the selection of cement component having the desired reactivity. A component having a high reactivity may exhibit a faster set time that one with a low reactivity.

As will be appreciated by those of ordinary skill in the art, the cement compositions disclosed herein may be used in a variety of subterranean applications, including primary and remedial cementing. The cement compositions may be introduced into a subterranean formation and allowed to set. As used herein, introducing the cement composition into a subterranean formation includes introduction into any portion of the subterranean formation, into near wellbore region surrounding the wellbore, or into both. In primary cementing applications, for example, the cement compositions may be introduced into the annular space between a conduit located in a wellbore and the walls of the wellbore (and/or a larger conduit in the wellbore), wherein the wellbore penetrates the subterranean formation. The cement composition may be allowed to set in the annular space to form an annular sheath of hardened cement. The cement composition may form a barrier that prevents the migration of fluids in the wellbore. The cement composition may also, for example, support the conduit in the wellbore. In remedial cementing applications, the cement compositions may be used, for example, in squeeze cementing operations or in the placement of cement plugs. By way of example, the cement compositions may be placed in a wellbore to plug an opening (e.g., a void or crack) in the formation, in a gravel pack, in the conduit, in the cement sheath, and/or between the cement sheath and the conduit (e.g., a microannulus).

While the present description refers to cement compositions and cement components, it should be understood that the techniques disclosed herein may be used with any suitable wellbore treatment composition and corresponding solid particulates of which cement compositions and cement components are one example. Additional examples of slurry compositions may include spacer fluids, drilling fluids, cleanup pills, lost circulation pills, and fracturing fluids, among others. Suitable solid particulates may include any of a variety of inorganic particles commonly used in well treatments.

Accordingly, this disclosure describes systems, compositions, and methods relating to slurry design process. Without limitation, the systems, compositions and methods may further be characterized by one or more of the following statements:

Statement 1: A method of analyzing a solid particulate comprising: measuring a water requirement of the solid particulate; and determining an approximation of specific surface area of the solid particulate from the water requirement.

Statement 2: The method of statement 1 wherein the water requirement is a weight ratio of water to the solid particulate required to obtain a predetermined consistency.

Statement 3: The method of statement 1 or statement 2 wherein the measuring the water requirement comprises preparing a blender with a specified amount of water, agitating the blender at a specified blender speed, adding the solid particulate to the water until a predetermined consistency is obtained, and calculating the water requirement based on a weight ratio of the water to the solid particulate to obtain the predetermined consistency.

Statement 4: The method of statement 3 wherein the specified consistency is obtained when a vortex formed at a surface in the blender is about 0 mm to about 50 mm in diameter while mixing the solid particulate and the water.

Statement 5: The method of any preceding statement wherein the determining an approximation of the specific surface area comprises inputting the water requirement into an equation to obtain an output of the approximation of the specific surface area.

Statement 6; The method of any preceding statement wherein the solid particulate comprises a silica source that is alkali soluble.

Statement 7: The method of any preceding statement wherein the solid particulate comprises at least one silica source selected from the group consisting of fly ash, slag, silica fume, crystalline silica, silica flour, cement kiln dust, volcanic rock, perlite, metakaolin, diatomaceous earth, zeolite, shale, agricultural waste ash, rice husk ash, sugar cane ash, Portland cement, bagasse ash, and combinations thereof.

Statement 8: The method of any preceding statement further comprising measuring at least one additional property for the solid particulate selected from the group consisting of compressive strength, Young's modulus, and tensile strength.

Statement 9: The method of any preceding statement further comprising determining a reactive index for the solid particulate based on the specific surface area.

Statement 10: The method of any preceding statement further comprising estimating a compressive strength of a cement composition comprising the solid particulate and one or more additional solid particulates, wherein the estimating uses the approximation of the specific surface for the solid particulate and specific surface areas for the one or more additional solid particulates as inputs to an equation that outputs the compressive strength, wherein the solid particulate and additional solid particulate are each cementitious.

Statement 11: The method of any preceding statement further comprising including the solid particulate in a cement composition and allowing the cement composition to set.

Statement 12. A method of cementing comprising: measuring a water requirement of a solid particulate; determining an approximation of specific surface area of the solid particulate from the water requirement; determining an approximation of compressive strength for a cement composition comprising the solid particulate; preparing the cement composition, wherein the cement composition comprises the solid particulate, one or more additional solid particulates, and water; and allowing the cement composition to set in a predetermined location.

Statement 13: The method of statement 12 further comprising introducing the cement composition into a wellbore.

Statement 14: The method of statement 13 wherein the cement composition is introduced into the wellbore using one or more pumps.

Statement 15: The method of any one of statements 12 to 14 wherein the cement composition is used in primary cementing to form a set cement sheath in a wellbore annulus Statement 16: The method of any one of statements 12 to 15 wherein the preparing comprising mixing components of the cement composition using mixing equipment, the components comprising the solid particulate, the one or more additional solid particulates, and the water.

Statement 17: The method of any one of statements 12 to 16 wherein the water requirement is a ratio of weight of water to weight of the solid particulate required to obtain a predetermined consistency.

Statement 18: The method of any one of statements 12 to 17 wherein the measuring the water requirement comprises preparing a blender with a specified amount of water, agitating the blender at a specified blender rpm, adding the solid particulate to the water until a specified consistency is obtained, and calculating the water requirement based on a weight ratio of the water to the solid particulate to obtain the specified consistency.

Statement 19: The method of any one of statements 12 to 18 wherein the determining an approximation of the specific surface area comprises inputting the water requirement into an equation to obtain an output of the approximation of the specific surface area.

Statement 20: The method of any one of statements 12 to 19 wherein the solid particulate comprises at least one silica source selected from the group consisting of fly ash, slag, silica fume, crystalline silica, silica flour, cement kiln dust, volcanic rock, perlite, metakaolin, diatomaceous earth, zeolite, shale, agricultural waste ash, rice husk ash, sugar cane ash, bagasse ash, and combinations thereof.

Statement 21: The method of any one of statements 12 to 20 further comprising measuring at least one additional property for the solid particulate selected from the group consisting of compressive strength, Young's modulus, and tensile strength and determining a reactive index for the solid particulate based on the approximation of specific surface area.

Statement 22: A system comprising: a solid particulate; a blender configured to mix the solid particulate with water; and a computer system configured to accept inputs of a water requirement for the solid particulate and output an approximation of specific surface area of the solid particulate.

Statement 23. The system of statement 22 wherein the computer system is configured to input the water requirement into an equation to obtain the output of the approximation of the specific surface area.

Statement 24: The system of statement 22 or statement 23 wherein the water requirement is a ratio of weight of water to weight of the solid particulate required to obtain a predetermined consistency.

Statement 25: The system of any one of statements 22 to 24 further comprising: a cement composition comprising the solid particulate, one or more additional solid particulates, and water; a pump fluid fluidly coupled to a tubular in fluid communication with a wellbore, wherein the tubular is configured to convey the cement composition to the wellbore; and a vessel disposed upstream of the pump, wherein the cement composition is disposed in the vessel.

Figure 3:
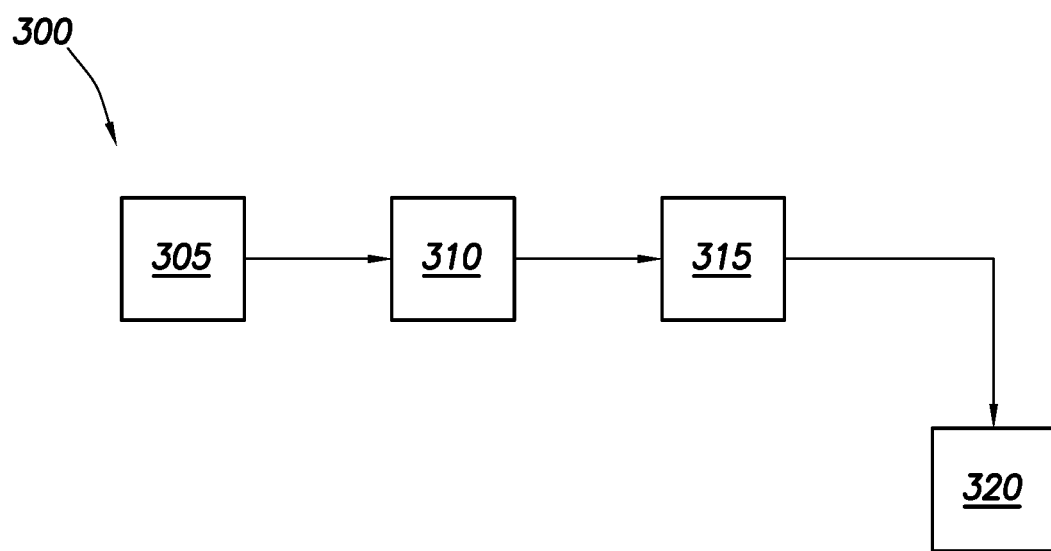
FIG. 3 is a schematic illustration of an example system for analyzing cement components.

Examples of the methods of using the reactivity mapping technique will now be described in more detail with reference to FIG. 3. A system 300 for analyzing the cement component is illustrated. The system 300 may comprise a cement component sample 305, analytical instrument 310, and computer system 315. Cement component sample 305 may be any cement component of interest. Cement components as previously described may be generally categorized as alkali soluble. The cement component sample may be placed or fed into analytical instrument 310. In some examples, analytical instrument 310 may be configured to automatically feed cement component sample 305 into analytical instrument 310. Analytical instrument 310 may be configured to analyze the physical and chemical properties of cement component sample 305. As previously described, physical and chemical properties may comprise, without limitation, morphology, chemical composition, water requirement, and others. By way of example, the analytical instrument 310 may be used to measure the water requirement for the cement component. The data generated by analytical instrument 310 may be sent to computer system 315 for processing. Computer system 315 may comprise a processor, memory, internal storage, input and output means, network connectivity means, and/or other components common to computer systems. Computer system 315 may take the data from analytical instrument 310 as input and store it in the storage for later processing. Processing the data may comprise inputting the data into algorithms which compute a result. Processing the data may also comprise organizing the data and mapping the data as previously described. In particular, the computer system may comprise algorithms configured to process the data to generate a predictive model of the physical and chemical behavior of cement component sample 305. Predictive models may be stored in a predictive model database 320 which may be stored locally or on a network. The predictive model database 320 may comprise all previous predictive models generated by the algorithms as well as maps of the generated data as well as the raw data.

Figure 4:
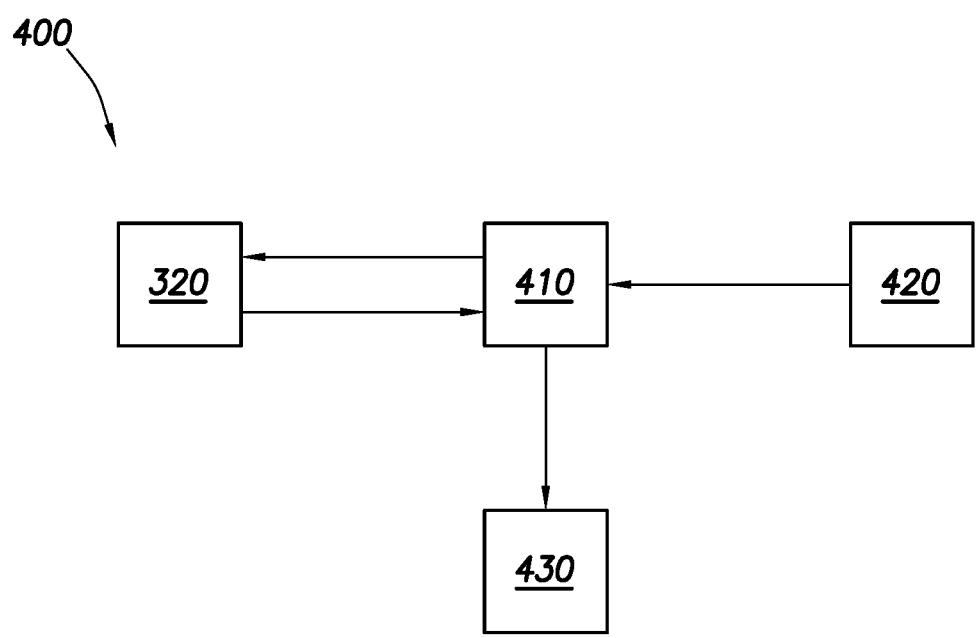
FIG. 4 is a schematic illustration of an example system for generating cement compositions.

Referring now to FIG. 4, a system 400 for generating cement compositions is illustrated. The system 400 may comprise a predictive model database 320 and computer system 410. In some examples, computer system 410 may be the same computer system 315 of FIG. 3. A user input 420 may define engineering parameters such as the required compressive strength of a cement slurry, the bottom hole static temperature of the wellbore, the required rheological properties of the slurry, the thickening time of the slurry, cement materials, cement additives, free fluid, permeability, pore pressure, frac gradient, mud weight, density, acid resistance, salt tolerance, and other parameters. Computer system 410 may be configured to input user input 420 and the predictive models, maps, and data stored in predictive model database 320 into a predictive cement algorithm. The predictive cement algorithm may generate a cement composition or compositions that meet the engineering requirements define by the user input 420. The output 430 of the predictive cement algorithm may contain the relative amounts of each cement component in the generated cement composition as well as the predicted material properties of the cement composition.

For example, if a user selects Portland cement, fly ash, and volcanic rock as the cement materials available the computer system may query predictive model database 320 for the required models, maps, and data corresponding to the cement materials. As previously described, there may be many different parameters such as particle size, regional source of the cement material, among others that may determine which set of data that is retrieved from predictive model database 320. The predictive cement algorithm may be configured to optimize the output cement slurry based on one or more parameters such as cost, compressive strength, or any other chosen parameter. In some examples, the predictive cement algorithm may determine an approximation of specific surface area from a measured water requirement. In some examples the predictive cement algorithm may optimize on two or more variable. The output of the algorithm in this example may be for example, 30% Portland by weight, 30% volcanic rock by weight, 20% fly ash, and 20% lime, with a 120% excess by weight of water. The generated slurry may conform within a margin of error to the engineering parameters supplied by user input 420. The generated slurry may be added to predictive model database 320 to be used in future calculations.

As previously discussed, the cement components may have secondary effects such as gelling, dispersive properties, and other secondary effects previously mentioned in addition to the primary effect of being cementitious when included in a cement composition. The predictive cement algorithm may calculate the secondary effects of each component in the cement slurry and optimize the relative amounts of each component to ensure the target parameters are met. User input 420 may specify, for example, a relatively higher free water requirement for the cement slurry. The predictive cement algorithm may choose to include a cement component that requires less water based on the maps and data to ensure that the free water requirement specified by user input 420 is met.

Figure 5:
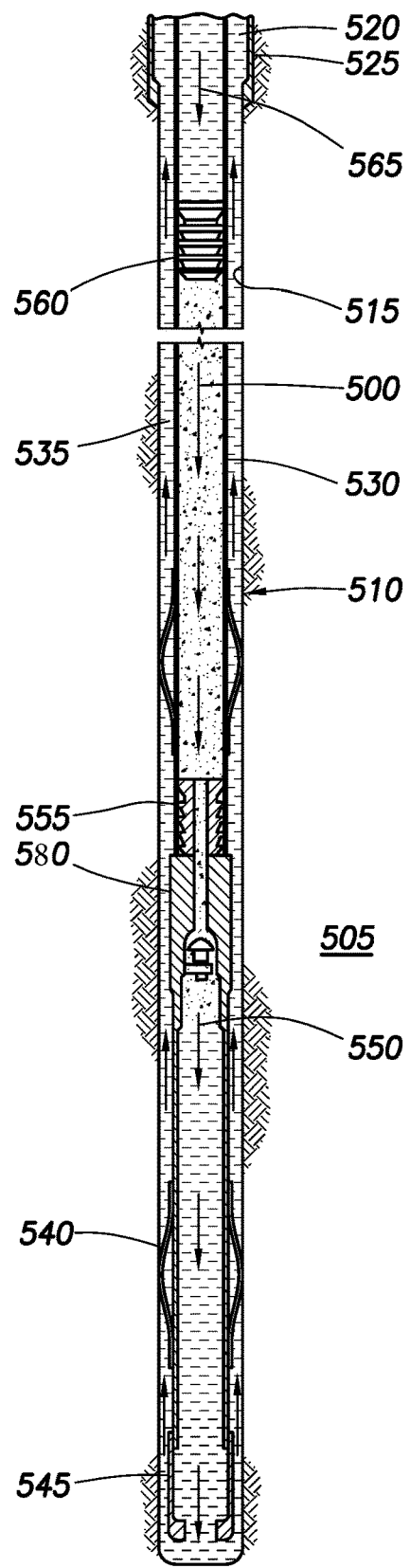
FIG. 5 is a schematic illustration of showing introduction of a cement composition into a wellbore.

Reference is now made to FIG. 5, illustrating use of a cement composition 500. Cement composition 500 may comprise any of the components described herein. Cement composition 500 may be designed, for example, using reactivity mapping as described herein. Turning now to FIG. 5, the cement composition 500 may be placed into a subterranean formation 505 in accordance with example systems, methods and cement compositions. As illustrated, a wellbore 510 may be drilled into the subterranean formation 505. While wellbore 510 is shown extending generally vertically into the subterranean formation 505, the principles described herein are also applicable to wellbores that extend at an angle through the subterranean formation 505, such as horizontal and slanted wellbores. As illustrated, the wellbore 510 comprises walls 515. In the illustration, a surface casing 520 has been inserted into the wellbore 510. The surface casing 520 may be cemented to the walls 515 of the wellbore 510 by cement sheath 525. In the illustration, one or more additional conduits (e.g., intermediate casing, production casing, liners, etc.), shown here as casing 530 may also be disposed in the wellbore 510. As illustrated, there is a wellbore annulus 535 formed between the casing 530 and the walls 515 of the wellbore 510 and/or the surface casing 520. One or more centralizers 540 may be attached to the casing 530, for example, to centralize the casing 530 in the wellbore 510 prior to and during the cementing operation.

With continued reference to FIG. 5, the cement composition 500 may be pumped down the interior of the casing 530. The cement composition 500 may be allowed to flow down the interior of the casing 530 through the casing shoe 545 at the bottom of the casing 530 and up around the casing 530 into the wellbore annulus 535. The cement composition 500 may be allowed to set in the wellbore annulus 535, for example, to form a cement sheath that supports and positions the casing 530 in the wellbore 510. While not illustrated, other techniques may also be utilized for introduction of the cement composition 500. By way of example, reverse circulation techniques may be used that include introducing the cement composition 500 into the subterranean formation 505 by way of the wellbore annulus 535 instead of through the casing 530. As it is introduced, the cement composition 500 may displace other fluids 550, such as drilling fluids and/or spacer fluids that may be present in the interior of the casing 530 and/or the wellbore annulus 535. While not illustrated, at least a portion of the displaced fluids 550 may exit the wellbore annulus 535 via a flow line and be deposited, for example, in one or more retention pits. A bottom plug 355 may be introduced into the wellbore 510 ahead of the cement composition 500, for example, to separate the cement composition 500 from the fluids 550 that may be inside the casing 530 prior to cementing. After the bottom plug 555 reaches the landing collar 580, a diaphragm or other suitable device should rupture to allow the cement composition 500 through the bottom plug 555. The bottom plug 555 is shown on the landing collar 580. In the illustration, a top plug 560 may be introduced into the wellbore 510 behind the cement composition 500. The top plug 360 may separate the cement composition 500 from a displacement fluid 565 and also push the cement composition 500 through the bottom plug 555.

The disclosed cement compositions and associated methods may directly or indirectly affect any pumping systems, which representatively includes any conduits, pipelines, trucks, tubulars, and/or pipes which may be coupled to the pump and/or any pumping systems and may be used to fluidically convey the cement compositions downhole, any pumps, compressors, or motors (e.g., topside or downhole) used to drive the cement compositions into motion, any valves or related joints used to regulate the pressure or flow rate of the cement compositions, and any sensors (i.e., pressure, temperature, flow rate, etc.), gauges, and/or combinations thereof, and the like. The cement compositions may also directly or indirectly affect any mixing hoppers and retention pits and their assorted variations.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The particular examples disclosed above are illustrative only, as the present invention may be modified and practiced in different but equivalent manners apparent to those skilled in the art having the benefit of the teachings herein. Although individual examples are discussed, the invention covers all combinations of all those examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of the present invention. If there is any conflict in the usages of a word or term in this specification and one or more patent(s) or other documents that may be incorporated herein by reference, the definitions that are consistent with this specification should be adopted.

What is claimed is:

1. A method of designing a cement composition based on analyzing a solid particulate comprising:
    measuring a water requirement of the solid particulate, wherein the measuring of the water requirement comprises measuring a consistency of an agitated mixture of water and the solid particulate and calculating the water requirement based on a ratio of an amount of water to an amount of solid particulate required to obtain a specified consistency;
    determining an approximation of specific surface area of the solid particulate from the water requirement;
    estimating a reactivity of the solid particulate based on the measured water requirement of the solid particulate and the determination of specific surface area of the solid particulate;
    designing the cement composition based on the estimated reactivity of the solid particulate;
    preparing the cement composition; and
    allowing the cement composition to cure to form a hardened mass.

2. The method of claim 1 wherein the water requirement is a weight ratio of water to the solid particulate required to obtain a predetermined consistency.

3. The method of claim 1 wherein the measuring the water requirement comprises preparing a blender with a specified amount of water, agitating the blender at a specified blender speed, adding the solid particulate to the water until a predetermined consistency is obtained, and calculating the water requirement based on a weight ratio of the water to the solid particulate to obtain the predetermined consistency.

4. The method of claim 3 wherein the specified consistency is obtained when a vortex formed at a surface in the blender is about 0 mm to about 50 mm in diameter while mixing the solid particulate and the water.

5. The method of claim 1 wherein the determining an approximation of specific surface area comprises inputting the water requirement into an equation to obtain an output of the approximation of the specific surface area.

6. The method of claim 1 wherein the solid particulate comprises a silica source that is alkali soluble.

7. The method of claim 1 wherein the solid particulate comprises at least one silica source selected from the group consisting of fly ash, slag, silica fume, crystalline silica, silica flour, cement kiln dust, volcanic rock, perlite, metakaolin, diatomaceous earth, zeolite, shale, agricultural waste ash, rice husk ash, sugar cane ash, Portland cement, bagasse ash, and combinations thereof.

8. The method of claim 1 further comprising measuring at least one additional property for the solid particulate selected from the group consisting of compressive strength, Young's modulus, and tensile strength.

9. The method of claim 1 further comprising including the solid particulate in a cement composition and allowing the cement composition to set.

10. The method of claim 1, wherein the agitated mixture comprises between 100 grams and 500 grams of water, wherein the agitated mixture is agitated in a blender at an rpm between 4,000 and 15,000, wherein the agitated mixture comprises between 1 gram and 1,000 grams of the solid particulate, wherein the measuring of the consistency of the agitated mixture comprises observing a vortex formed at a surface of the agitated mixture, wherein the vortex has a size between 0.1 millimeters and 25 millimeters.

11. A method of cementing comprising:
    measuring a water requirement of a solid particulate, wherein the measuring of the water requirement comprises measuring a consistency of an agitated mixture of water and the solid particulate and calculating the water requirement based on a ratio of an amount of water to an amount of solid particulate required to obtain a specified consistency;

determining an approximation of specific surface area of the solid particulate from the water requirement;

correlating a reactivity of the solid particulate to the water requirement and the specific surface area of the solid particulate giving an estimated reactivity of the solid particulate;

designing a cement composition based on the estimated reactivity of the solid particulate;

determining an approximation of compressive strength for the cement composition comprising the solid particulate;

preparing the cement composition, wherein the cement composition comprises the solid particulate, one or more additional solid particulates, and water; and allowing the cement composition to set in a predetermined location.

12. The method of claim 11 further comprising introducing the cement composition into a wellbore.

13. The method of claim 11 wherein the cement composition is used in primary cementing to form a set cement sheath in a wellbore annulus.

14. The method of claim 11 wherein preparing the cement composition comprises mixing components of the cement composition using mixing equipment, the components comprising the solid particulate, the one or more additional solid particulates, and the water.

15. The method of claim 11 wherein the water requirement is a ratio of weight of water to weight of the solid particulate required to obtain a predetermined consistency.

16. The method of claim 11 wherein the measuring the water requirement comprises preparing a blender with a specified amount of water, agitating the blender at a specified blender rpm, adding the solid particulate to the water until a specified consistency is obtained, and calculating the water requirement based on a weight ratio of the water to the solid particulate to obtain the specified consistency.

17. The method of claim 11 wherein the determining an approximation of specific surface area comprises inputting the water requirement into an equation to obtain an output of the approximation of the specific surface area.

18. The method of claim 11 wherein the solid particulate comprises at least one silica source selected from the group consisting of fly ash, slag, silica fume, crystalline silica, silica flour, cement kiln dust, volcanic rock, perlite, metakaolin, diatomaceous earth, zeolite, shale, agricultural waste ash, rice husk ash, sugar cane ash, bagasse ash, and combinations thereof.

19. The method of claim 11 further comprising measuring at least one additional property for the solid particulate selected from the group consisting of compressive strength, Young's modulus, and tensile strength and determining a reactive index for the solid particulate based on the approximation of specific surface area.

20. A system comprising:
a solid particulate;
a blender configured to mix the solid particulate with water;
an analytical equipment configured to measure a water requirement of the solid particulate; and
a computer system configured to accept inputs of a water requirement for the solid particulate, wherein the water requirement is determined based on a ratio of an amount of water to an amount of solid particulate required to obtain a specified consistency, output an approximation of specific surface area and reactivity of the solid particulate, and design a cement which includes the solid particulate based in part on the approximation of the specific surface area and the reactivity of the solid particulate.

21. The system of claim 20 wherein the computer system is configured to input the water requirement into an equation to obtain the output of the approximation of specific surface area.

22. The system of claim 20 wherein the water requirement is a ratio of weight of water to weight of the solid particulate required to obtain a predetermined consistency.

* * * * *